US009866850B2

(12) United States Patent
Lou et al.

(10) Patent No.: US 9,866,850 B2
(45) **Date of Patent: *Jan. 9, 2018**

(54) METHOD OF DETERMINING BINARY CODEWORDS FOR TRANSFORM COEFFICIENTS

(71) Applicant: GOOGLE TECHNOLOGY HOLDINGS LLC, Mountain View, CA (US)

(72) Inventors: Jian Lou, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,548

(22) Filed: Apr. 27, 2017

(65) Prior Publication Data

US 2017/0237995 A1 Aug. 17, 2017

Related U.S. Application Data

(63) Continuation of application No. 13/672,103, filed on Nov. 8, 2012, now Pat. No. 9,641,835.

(Continued)

(51) Int. Cl.

*H04N 19/21* (2014.01)
*H04N 19/18* (2014.01)
*H04N 19/91* (2014.01)

(52) U.S. Cl.

CPC ............ *H04N 19/18* (2014.11); *H04N 19/21* (2014.11); *H04N 19/91* (2014.11)

(58) Field of Classification Search

CPC ............................... H04N 19/91; H04N 19/21

See application file for complete search history.

(56) References Cited

U.S. PATENT DOCUMENTS

2013/0114685 A1* 5/2013 Kerofsky ............ H04N 19/126 375/240.03
2013/0114693 A1* 5/2013 Gao .................... H04N 19/593 375/240.03

OTHER PUBLICATIONS

Tung Nguyen et al. Reduced complexity entropy coding of transform coefficient levels using truncated golomb-rice codes in video compression.*

(Continued)

*Primary Examiner* — Mehrdad Dastouri
*Assistant Examiner* — Rowina Cattungal
(74) *Attorney, Agent, or Firm* — Young Basile Hanlon & MacFarlane, P.C.

(57) ABSTRACT

Decoding a symbol may include decoding a binary codeword from an encoded video stream and decoding a symbol from the binary codeword, wherein the binary codeword is a binary codeword generated by an encoder for the symbol by determining a truncated rice prefix for a symbol, the symbol having a parameter variable, in response to a determination that the parameter variable is greater than zero, determining a truncated rice suffix for the symbol and concatenating the end of the truncated rice prefix with the truncated rice suffix to determine a main prefix, and in response to a determination that the main prefix is the same as a comparison string, wherein the comparison string is a bin string with each bin set to "1", determining a main suffix for the symbol by concatenating the end of the main prefix with the main suffix to determine the binary codeword for the symbol.

20 Claims, 16 Drawing Sheets

Related U.S. Application Data

(60) Provisional application No. 61/557,403, filed on Nov. 8, 2011.

(56) References Cited

OTHER PUBLICATIONS

Nguyen et al. Reduced-complexity entropy coding of transform coefficients levels using a combination of VLC and PIPE.*
Boss B et al. (WD4:Working Draft 4 of High-Efficiency Video Coding).*
Nguyen (Fraunhoffer HHI) T: CE11: Coding of transform coefficient levels with Golomb-Rice codes.*

* cited by examiner 226, 228, 230

| cRICEPARAM | 0 | | 1 | | 2 | | 3 | |
|---|---|---|---|---|---|---|---|---|
| SYMBOL | CODEWORD | BITS | CODEWORD | BITS | CODEWORD | BITS | CODEWORD | BITS |
| 0 | 0 | 1 | 00 | 2 | 000 | 3 | 0000 | 4 |
| 1 | 10 | 2 | 01 | 2 | 001 | 3 | 0001 | 4 |
| 2 | 110 | 3 | 100 | 3 | 010 | 3 | 0010 | 4 |
| 3 | 1110 | 4 | 101 | 3 | 011 | 3 | 0011 | 4 |
| 4 | 11110 | 5 | 1100 | 4 | 1000 | 4 | 0100 | 4 |
| 5 | 111110 | 6 | 1101 | 4 | 1001 | 4 | 0101 | 4 |
| 6 | 1111110 | 7 | 11100 | 5 | 1010 | 4 | 0110 | 4 |
| 7 | 11111110 | 8 | 11101 | 5 | 1011 | 4 | 0111 | 4 |
| 8 | 11111111, EG0 | 9 | 111100 | 6 | 11000 | 5 | 10000 | 5 |
| 9 | | | 111101 | 6 | 11001 | 5 | 10001 | 5 |
| 10 | | | 1111100 | 7 | 11010 | 5 | 10010 | 5 |
| 11 | | | 1111101 | 7 | 11011 | 5 | 10011 | 5 |
| 12 | | | 11111100 | 8 | 111000 | 6 | 10100 | 5 |
| 13 | | | 11111101 | 8 | 111001 | 6 | 10101 | 5 |
| 14 | | | 111111100 | 9 | 111010 | 6 | 10110 | 5 |
| 15 | | | 111111101 | 9 | 111011 | 6 | 10111 | 5 |
| 16 | | | 1111111100 | 10 | 1111000 | 7 | 110000 | 6 |
| 17 | | | 1111111101 | 10 | 1111001 | 7 | 110001 | 6 |
| 18 | | | 11111111100 | 11 | 1111010 | 7 | 110010 | 6 |
| 19 | | | 11111111101 | 11 | 1111011 | 7 | 110011 | 6 |
| 20 | | | 11111111110 | 11 | 11111000 | 8 | 110100 | |

| |
|---|
| FIG. 14A |
| FIG. 14B |
| FIG. 14C |

| | | | | | | | | |
|---|---|---|---|---|---|---|---|---|
| 21 | | | 11111111111, EG0 | 12 | 11111001 | 8 | 110101 | 6 |
| 22 | | | | | 11111010 | 8 | 110110 | 6 |
| 23 | | | | | 11111011 | 8 | 110111 | 6 |
| 24 | | | | | 111111000 | 9 | 1110000 | 7 |
| 25 | | | | | 111111001 | 9 | 1110001 | 7 |
| 26 | | | | | 111111010 | 9 | 1110010 | 7 |
| 27 | | | | | 111111011 | 9 | 1110011 | 7 |
| 28 | | | | | 1111111000 | 10 | 1110100 | 7 |
| 29 | | | | | 1111111001 | 10 | 1110101 | 7 |
| 30 | | | | | 1111111010 | 10 | 1110110 | 7 |
| 31 | | | | | 1111111011 | 10 | 1110111 | 7 |
| 32 | | | | | 11111111000 | 11 | 11110000 | 8 |
| 33 | | | | | 11111111001 | 11 | 11110001 | 8 |
| 34 | | | | | 11111111010 | 11 | 11110010 | 8 |
| 35 | | | | | 11111111011 | 11 | 11110011 | 8 |
| 36 | | | | | 111111111000 | 12 | 11110100 | 8 |
| 37 | | | | | 111111111001 | 12 | 11110101 | 8 |
| 38 | | | | | 111111111010 | 12 | 11110110 | 8 |
| 39 | | | | | 111111111011 | 12 | 11110111 | 8 |
| 40 | | | | | 111111111100 | 12 | 111110000 | 9 |
| 41 | | | | | 111111111101 | 12 | 111110001 | 9 |
| 42 | | | | | 111111111110 | 12 | 111110010 | 9 |
| 43 | | | | | 111111111111, EG0 | 13 | 111110011 | 9 |
| 44 | | | | | | | 111110100 | 9 |
| 45 | | | | | | | 111110101 | 9 |
| 46 | | | | | | | 111110110 | 9 |
| 47 | | | | | | | 111110111 | 9 |
| 48 | | | | | | | 1111110000 | 10 |

FIG. 14B

| | | | | | | | | |
|---|---|---|---|---|---|---|---|---|
| 49 | | | | | | | 1111110001 | 10 |
| 50 | | | | | | | 1111110010 | 10 |
| 51 | | | | | | | 1111110011 | 10 |
| 52 | | | | | | | 1111110100 | 10 |
| 53 | | | | | | | 1111110101 | 10 |
| 54 | | | | | | | 1111110110 | 10 |
| 55 | | | | | | | 1111110111 | 10 |
| 56 | | | | | | | 11111110000 | 11 |
| 57 | | | | | | | 11111110001 | 11 |
| 58 | | | | | | | 11111110010 | 11 |
| 59 | | | | | | | 11111110011 | 11 |
| 60 | | | | | | | 11111110100 | 11 |
| 61 | | | | | | | 11111110101 | 11 |
| 62 | | | | | | | 11111110110 | 11 |
| 63 | | | | | | | 11111110111 | 11 |
| 64 | | | | | | | 11111111000 | 11 |
| 65 | | | | | | | 11111111001 | 11 |
| 66 | | | | | | | 11111111010 | 11 |
| 67 | | | | | | | 11111111011 | 11 |
| 68 | | | | | | | 11111111100 | 11 |
| 69 | | | | | | | 11111111101 | 11 |
| 70 | | | | | | | 11111111110 | 11 |
| 71 | | | | | | | 11111111111, EG0 | 12 |

| | | COEFF_ABS_LEVEL_MINUS 3[n-1] | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | ≥15 |
| PREVIOUS cRICEPARAM | 0 | 0 | 0 | 1 | 1 | 2 | 2 | 2 | 2 | 2 | 2 | 2 | 2 | 3 | 3 | 3 | 3 |
| | 1 | 1 | 1 | 1 | 1 | 2 | 2 | 2 | 2 | 2 | 2 | 2 | 3 | 3 | 3 | 3 | 3 |
| | 2 | 2 | 2 | 2 | 2 | 2 | 2 | 2 | 2 | 2 | 2 | 2 | 3 | 3 | 3 | 3 | 3 |
| | 3 | 3 | 3 | 3 | 3 | 3 | 3 | 3 | 3 | 3 | 3 | 3 | 3 | 3 | 3 | 3 | 3 |

230

230

230 232

| cRICEPARAM | cTRMAX |
|---|---|
| 0 | 7 |
| 1 | 20 |
| 2 | 42 |
| 3 | 70 |

FIG. 17A 230 232

| cRICEPARAM | cTRMAX |
|---|---|
| 0 | 8 |
| 1 | 20 |
| 2 | 42 |
| 3 | 70 |

FIG. 17B

| | CONST UINT G_AUIGORICEPREFIXLEN[4]= {8,10,11,8}; | | CONST UINT G_AUIGORICEPREFIXLEN[4]= {8,10,10,8}; | |
|---|---|---|---|---|
| SYMBOL | CODEWORD | BITS | CODEWORD | BITS |
| 40 | 1111111111000 | 13 | 111111111100 | 12 |
| 41 | 1111111111001 | 13 | 111111111101 | 12 |
| 42 | 1111111111010 | 13 | 111111111110 | 12 |
| 43 | 1111111111011, EGO | 14 | 111111111111, EGO | 13 |

| VALUE OF SYNTAX ELEMENT | BIN STRING | | | | | |
|---|---|---|---|---|---|---|
| 0 (I_NxN) | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| . . . | | | | | | |
| BINIDX | 0 | 1 | 2 | 3 | 4 | 5 |

FIG. 20

METHOD OF DETERMINING BINARY CODEWORDS FOR TRANSFORM COEFFICIENTS

CROSS-REFERENCE TO RELATED APPLICATION(S)

This application is a continuation of U.S. application patent Ser. No. 13/672,103, filed Nov. 8, 2012, now U.S. Pat. No. 9,641,835, which claims priority to U.S. Provisional Patent Application No. 61/557,403, filed Nov. 8, 2011, the entire disclosure of each of which is hereby incorporated by reference.

BACKGROUND

Technical Field

The present disclosure relates to the field of video compression, particularly video compression using High Efficiency Video Coding (HEVC) that employ block processing.

Related Art

FIG. 1 depicts a content distribution system 100 comprising a coding system 110 and a decoding system 140 that can be used to transmit and receive HEVC data. In some embodiments, the coding system 110 can comprise an input interface 130, a controller 111, a counter 112, a frame memory 113, an encoding unit 114, a transmitter buffer 115 and an output interface 135. The decoding system 140 can comprise a receiver buffer 150, a decoding unit 151, a frame memory 152 and a controller 153. The coding system 110 and the decoding system 140 can be coupled with each other via a transmission path which can carry a compressed bitstream 105. The controller 111 of the coding system 110 can control the amount of data to be transmitted on the basis of the capacity of the receiver buffer 150 and can include other parameters such as the amount of data per a unit of time. The controller 111 can control the encoding unit 114 to prevent the occurrence of a failure of a received signal decoding operation of the decoding system 140. The controller 111 can be a processor or include, by way of a non-limiting example, a microcomputer having a processor, a random access memory and a read only memory.

Source pictures 120 supplied from, by way of a non-limiting example, a content provider can include a video sequence of frames including source pictures in a video sequence. The source pictures 120 can be uncompressed or compressed. If the source pictures 120 are uncompressed, the coding system 110 can have an encoding function. If the source pictures 120 are compressed, the coding system 110 can have a transcoding function. Coding units can be derived from the source pictures utilizing the controller 111. The frame memory 113 can have a first area that can be used for storing the incoming frames from the source pictures 120 and a second area that can be used for reading out the frames and outputting them to the encoding unit 114. The controller 111 can output an area switching control signal 123 to the frame memory 113. The area switching control signal 123 can indicate whether the first area or the second area is to be utilized.

The controller 111 can output an encoding control signal 124 to the encoding unit 114. The encoding control signal 124 can cause the encoding unit 114 to start an encoding operation, such as preparing the Coding Units based on a source picture. In response to the encoding control signal 124 from the controller 111, the encoding unit 114 can begin to read out the prepared Coding Units to a high-efficiency encoding process, such as a prediction coding process or a transform coding process which process the prepared Coding Units generating video compression data based on the source pictures associated with the Coding Units.

The encoding unit 114 can package the generated video compression data in a packetized elementary stream (PES) including video packets. The encoding unit 114 can map the video packets into an encoded video signal 122 using control information and a program time stamp (PTS) and the encoded video signal 122 can be transmitted to the transmitter buffer 115.

The encoded video signal 122, including the generated video compression data, can be stored in the transmitter buffer 115. The information amount counter 112 can be incremented to indicate the total amount of data in the transmitter buffer 115. As data is retrieved and removed from the buffer, the counter 112 can be decremented to reflect the amount of data in the transmitter buffer 115. The occupied area information signal 126 can be transmitted to the counter 112 to indicate whether data from the encoding unit 114 has been added or removed from the transmitter buffer 115 so the counter 112 can be incremented or decremented. The controller 111 can control the production of video packets produced by the encoding unit 114 on the basis of the occupied area information 126 which can be communicated in order to anticipate, avoid, prevent, and/or detect an overflow or underflow from taking place in the transmitter buffer 115.

The information amount counter 112 can be reset in response to a preset signal 128 generated and output by the controller 111. After the information counter 112 is reset, it can count data output by the encoding unit 114 and obtain the amount of video compression data and/or video packets which have been generated. The information amount counter 112 can supply the controller 111 with an information amount signal 129 representative of the obtained amount of information. The controller 111 can control the encoding unit 114 so that there is no overflow at the transmitter buffer 115.

In some embodiments, the decoding system 140 can comprise an input interface 170, a receiver buffer 150, a controller 153, a frame memory 152, a decoding unit 151 and an output interface 175. The receiver buffer 150 of the decoding system 140 can temporarily store the compressed bitstream 105, including the received video compression data and video packets based on the source pictures from the source pictures 120. The decoding system 140 can read the control information and presentation time stamp information associated with video packets in the received data and output a frame number signal 163 which can be applied to the controller 153. The controller 153 can supervise the counted number of frames at a predetermined interval. By way of a non-limiting example, the controller 153 can supervise the counted number of frames each time the decoding unit 151 completes a decoding operation.

In some embodiments, when the frame number signal 163 indicates the receiver buffer 150 is at a predetermined capacity, the controller 153 can output a decoding start signal 164 to the decoding unit 151. When the frame number signal 163 indicates the receiver buffer 150 is at less than a predetermined capacity, the controller 153 can wait for the occurrence of a situation in which the counted number of frames becomes equal to the predetermined amount. The controller 153 can output the decoding start signal 164 when the situation occurs. By way of a non-limiting example, the controller 153 can output the decoding start signal 164 when the frame number signal 163 indicates the receiver buffer 150 is at the predetermined capacity. The encoded video packets and video compression data can be decoded in a monotonic order (i.e., increasing or decreasing) based on presentation time stamps associated with the encoded video packets.

In response to the decoding start signal 164, the decoding unit 151 can decode data amounting to one picture associated with a frame and compressed video data associated with the picture associated with video packets from the receiver buffer 150. The decoding unit 151 can write a decoded video signal 162 into the frame memory 152. The frame memory 152 can have a first area into which the decoded video signal is written, and a second area used for reading out decoded pictures 160 to the output interface 175.

In various embodiments, the coding system 110 can be incorporated or otherwise associated with a transcoder or an encoding apparatus at a headend and the decoding system 140 can be incorporated or otherwise associated with a downstream device, such as a mobile device, a set top box or a transcoder.

The coding system 110 and decoding system 140 can be utilized separately or together to encode and decode video data according to various coding formats, including High Efficiency Video Coding (HEVC). HEVC is a block based hybrid spatial and temporal predictive coding scheme. In HEVC, input images, such as video frames, can be divided into square blocks called Largest Coding Units (LCUs) 200, as shown in FIG. 2. LCUs 200 can each be as large as 128×128 pixels, unlike other coding schemes that break input images into macroblocks of 16×16 pixels. As shown in FIG. 3, each LCU 200 can be partitioned by splitting the LCU 200 into four Coding Units (CUs) 202. CUs 202 can be square blocks each a quarter size of the LCU 200. Each CU 202 can be further split into four smaller CUs 202 each a quarter size of the larger CU 202. By way of a non-limiting example, the CU 202 in the upper right corner of the LCU 200 depicted in FIG. 3 can be divided into four smaller CUs 202. In some embodiments, these smaller CUs 202 can be further split into even smaller sized quarters, and this process of splitting CUs 202 into smaller CUs 202 can be completed multiple times.

With higher and higher video data density, what is needed are further improved ways to code the CUs so that large input images and/or macroblocks can be rapidly, efficiently and accurately encoded and decoded.

SUMMARY

The present invention provides an improved system for HEVC. In embodiments for the system, a method of determining transform coefficients from binary codewords in an efficient manner is provided. Codewords for the transform coefficients within transform units (TUs) that are subdivisions of the CUs 202 are used in encoding input images and/or macroblocks.

In one embodiment, a method is provided that uses a truncated rice bin string to decode a codeword for a transform coefficient. The method in the embodiment comprises decoding a symbol from an encoded video stream by decoding a binary codeword from an encoded video stream, and decoding a symbol from the binary codeword. The binary codeword is a binary codeword generated by an encoder for the symbol by determining a truncated rice prefix for a symbol, the symbol having a parameter variable, in response to a determination that the parameter variable is greater than zero, determining a truncated rice suffix for the symbol and concatenating the end of the truncated rice prefix with the truncated rice suffix to determine a main prefix, and in response to a determination that the main prefix is the same as a comparison string, wherein the comparison string is a bin string with each bin set to "1", determining a main suffix for the symbol by concatenating the end of the main prefix with the main suffix to determine the binary codeword for the symbol.

Another embodiment is a video decoder comprising a memory configured to store a symbol, and a processor coupled with the memory. The processor is configured to determine the symbol from a binary codeword by decoding the binary codeword from an encoded video stream, and decoding the symbol from the binary codeword. The binary codeword is a binary codeword generated by an encoder for the symbol by determining a truncated rice prefix for the symbol, in response to a determination that a parameter variable is greater than zero, determining a truncated rice suffix for the symbol and determining a main prefix by concatenating the end of the truncated rice prefix with the truncated rice suffix, and in response to a determination that the main prefix is the same as a comparison string, wherein the comparison string is a bin string with each bin set to "1", determining a main suffix for the symbol and determining the binary codeword by concatenating the end of the main prefix with the main suffix.

Another embodiment is a non-transitory computer readable medium containing program instructions for determining a symbol from a binary codeword, that, when executed by a processor, facilitate performance of operations including decoding a binary codeword from an encoded video stream, and decoding a symbol from the binary codeword. The binary codeword is a binary codeword generated by an encoder for the symbol by receiving a symbol, a parameter variable, and a maximum symbol value associated with the parameter variable, determining a truncated rice prefix for the symbol, in response to a determination that the parameter variable is greater than zero, determining a truncated rice suffix for the symbol and determining a main prefix by concatenating the end of the truncated rice prefix with the truncated rice suffix, and in response to a determination that the main prefix is the same as a comparison string, wherein the comparison string is a bin string with each bin set to "1", determining a main suffix for the symbol and determining the binary codeword for the symbol by concatenating the end of the main prefix with the main suffix.

BRIEF DESCRIPTION OF THE DRAWINGS

Further details of the present invention are explained with the help of the attached drawings in which:

FIG. 14, including FIG. 14A, FIG. 14B, and FIG. 14C, depicts an exemplary embodiment of a table of binary codewords generated based on symbols and parameter variables;

FIG. 17A depicts a table of exemplary maximum symbol values associated with values of the parameter variable;

FIG. 17B depicts a table of exemplary maximum symbol values associated with values of the parameter variable;

FIG. 18 depicts a portion of FIG. 14 generated using different maximum lengths.

FIG. 20 depicts a table of bin strings determined by a Unary Binarization Process.

DETAILED DESCRIPTION

In HEVC, an input image, such as a video frame, is broken up into CUs that are then identified in code. The CUs are then further broken into sub-units that are coded as will be described subsequently.

Figure 1:
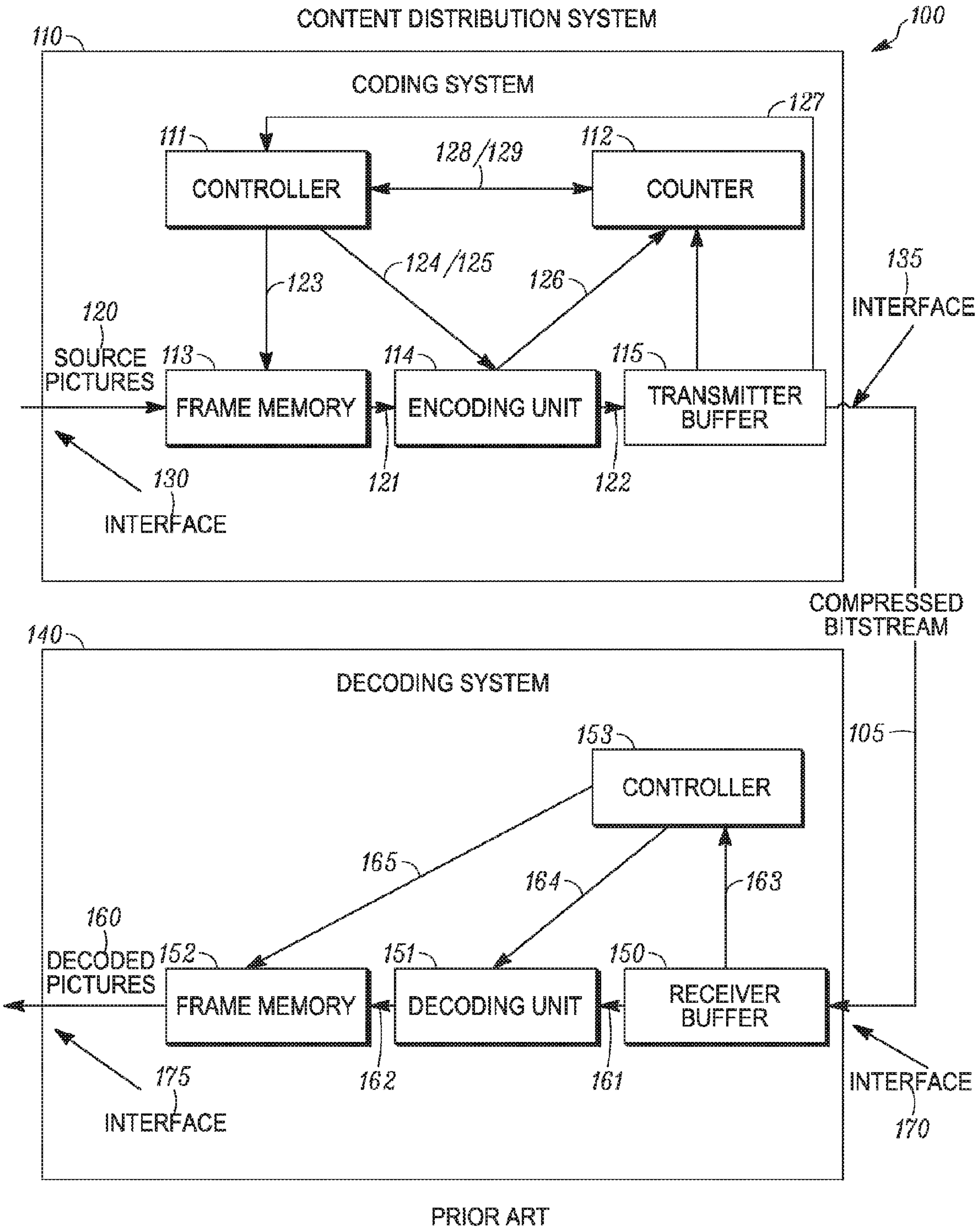
FIG. 1 depicts an embodiment of a content distribution system.
Figure 2:
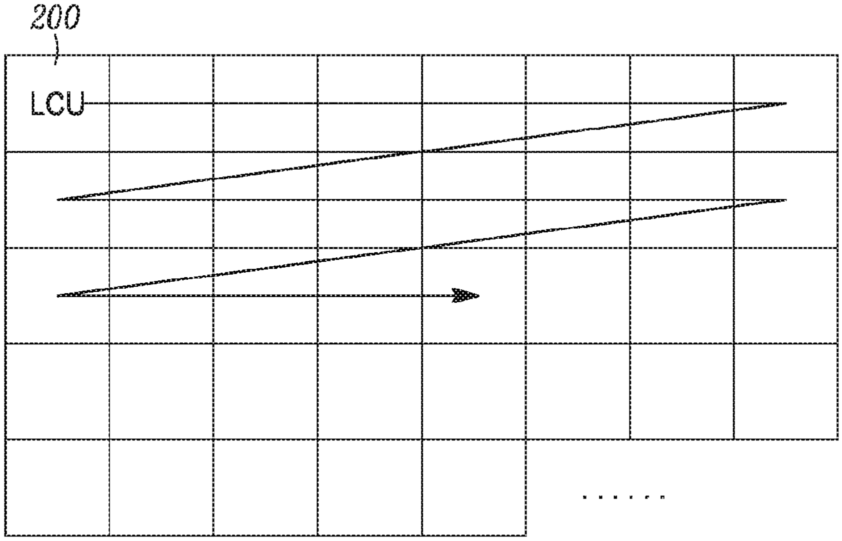
FIG. 2 depicts an embodiment of an input image divided into Large Coding Units.
Figure 3:
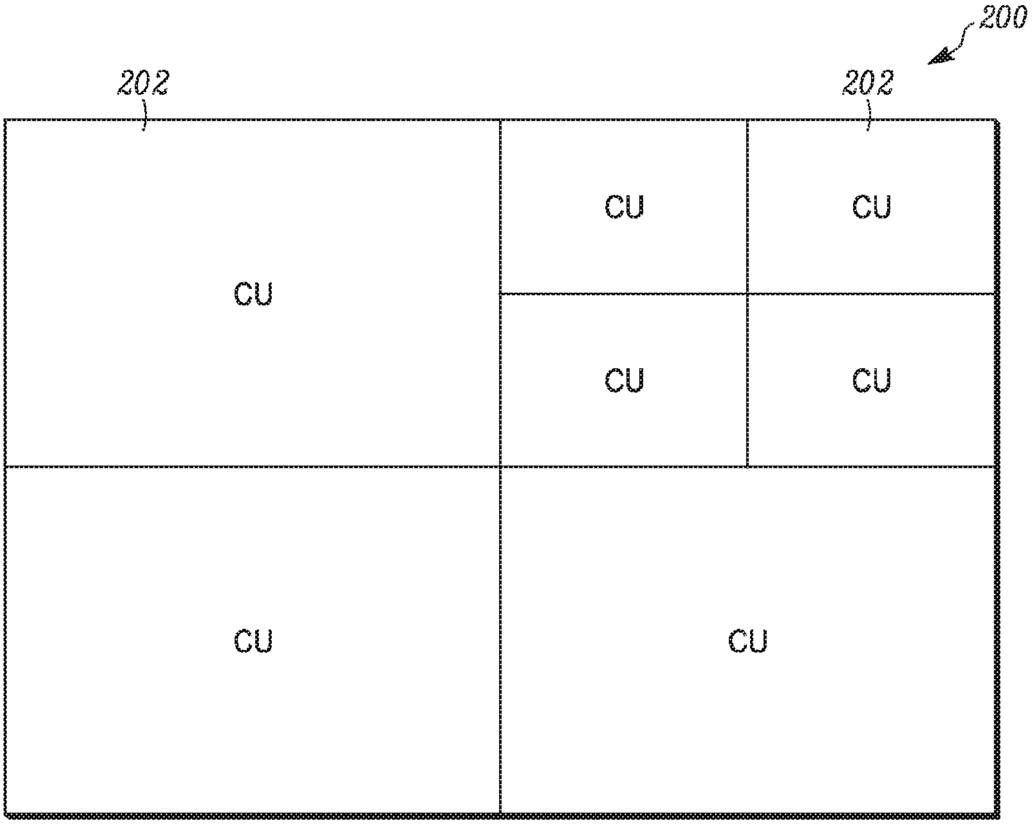
FIG. 3 depicts an embodiment of a Large Coding Unit divided into Coding Units.
Figure 4:
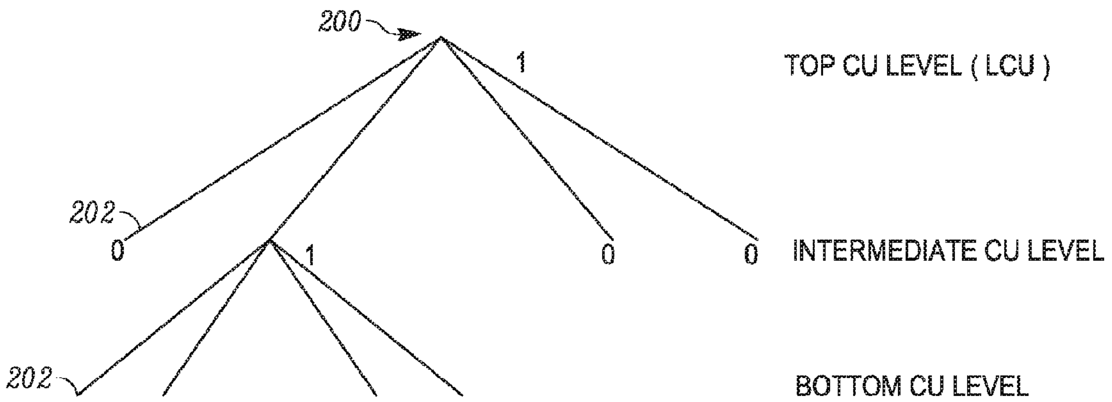
FIG. 4 depicts a quadtree representation of a Large Coding Unit divided into Coding Units.

Initially for the coding a quadtree data representation can be used to describe the partition of a LCU 200. The quadtree representation can have nodes corresponding to the LCU 200 and CUs 202. At each node of the quadtree representation, a flag "1" can be assigned if the LCU 200 or CU 202 is split into four CUs 202. If the node is not split into CUs 202, a flag "0" can be assigned. By way of a non-limiting example, the quadtree representation shown in FIG. 4 can describe the LCU partition shown in FIG. 3, in which the LCU 200 is split into four CUs 202, and the second CU 202 is split into four smaller CUs 202. The binary data representation of the quadtree can be a CU split flag that can be coded and transmitted as overhead, along with other data such as a skip mode flag, merge mode flag, and the PU coding mode described subsequently. By way of a non-limiting example, the CU split flag quadtree representation shown in FIG. 4 can be coded as the binary data representation "10100."

Figure 5:
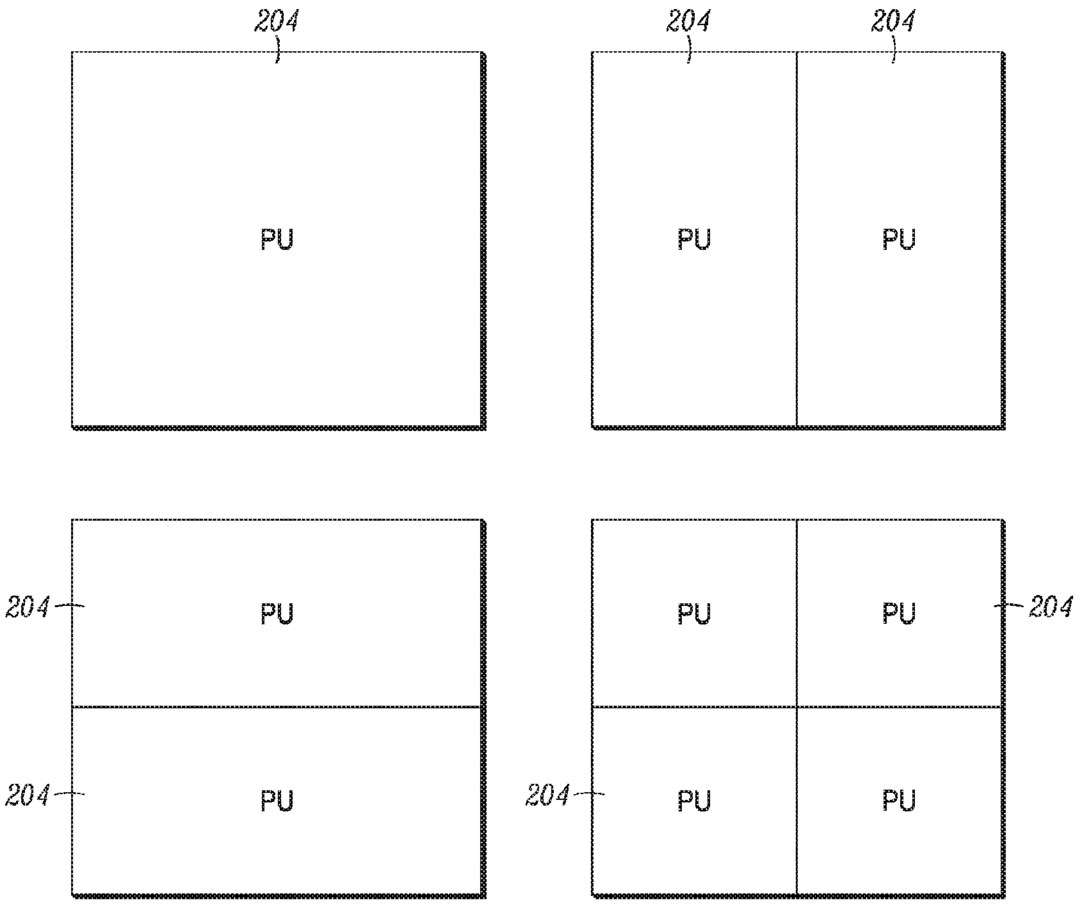
FIG. 5 depicts possible exemplary arrangements of Prediction Units within a Coding Unit.

At each leaf of the quadtree, the final CUs 202 can be broken up into one or more blocks called prediction units (PUs) 204. PUs 204 can be square or rectangular. A CU 202 with dimensions of 2N×2N can have one of the four exemplary arrangements of PUs 204 shown in FIG. 5, with PUs 204 having dimensions of 2N×2N, 2N×N, N×2N, or N×N.

A PU can be obtained through spatial or temporal prediction. Temporal prediction is related to inter mode pictures. Spatial prediction relates to intra mode pictures. The PUs 204 of each CU 202 can, thus, be coded in either intra mode or inter mode. Features of coding relating to intra mode and inter mode pictures is described in the paragraphs to follow.

Intra mode coding can use data from the current input image, without referring to other images, to code an I picture. In intra mode the PUs 204 can be spatially predictive coded. Each PU 204 of a CU 202 can have its own spatial prediction direction. Spatial prediction directions can be horizontal, vertical, 45-degree diagonal, 135 degree diagonal, DC, planar, or any other direction. The spatial prediction direction for the PU 204 can be coded as a syntax element. In some embodiments, brightness information (Luma) and color information (Chroma) for the PU 204 can be predicted separately. In some embodiments, the number of Luma intra prediction modes for 4×4, 8×8, 16×16, 32×32, and 64×64 blocks can be 18, 35, 35, 35, and 4 respectively. In alternate embodiments, the number of Luma intra prediction modes for blocks of any size can be 35. An additional mode can be used for the Chroma intra prediction mode. In some embodiments, the Chroma prediction mode can be called "IntraFromLuma."

Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU 204 over the associated reference images. The best match prediction can be described by the motion vectors and associated reference images. P pictures use data from the current input image and one or more previous reference images. B pictures use data from the current input image and both previous and subsequent reference images, and can have up to two motion vectors. The motion vectors and reference pictures can be coded in the HEVC bitstream. In some embodiments, the motion vectors can be coded as syntax elements "MV," and the reference pictures can be coded as syntax elements "refIdx." In some embodiments, inter mode coding can allow both spatial and temporal predictive coding.

Figure 6:
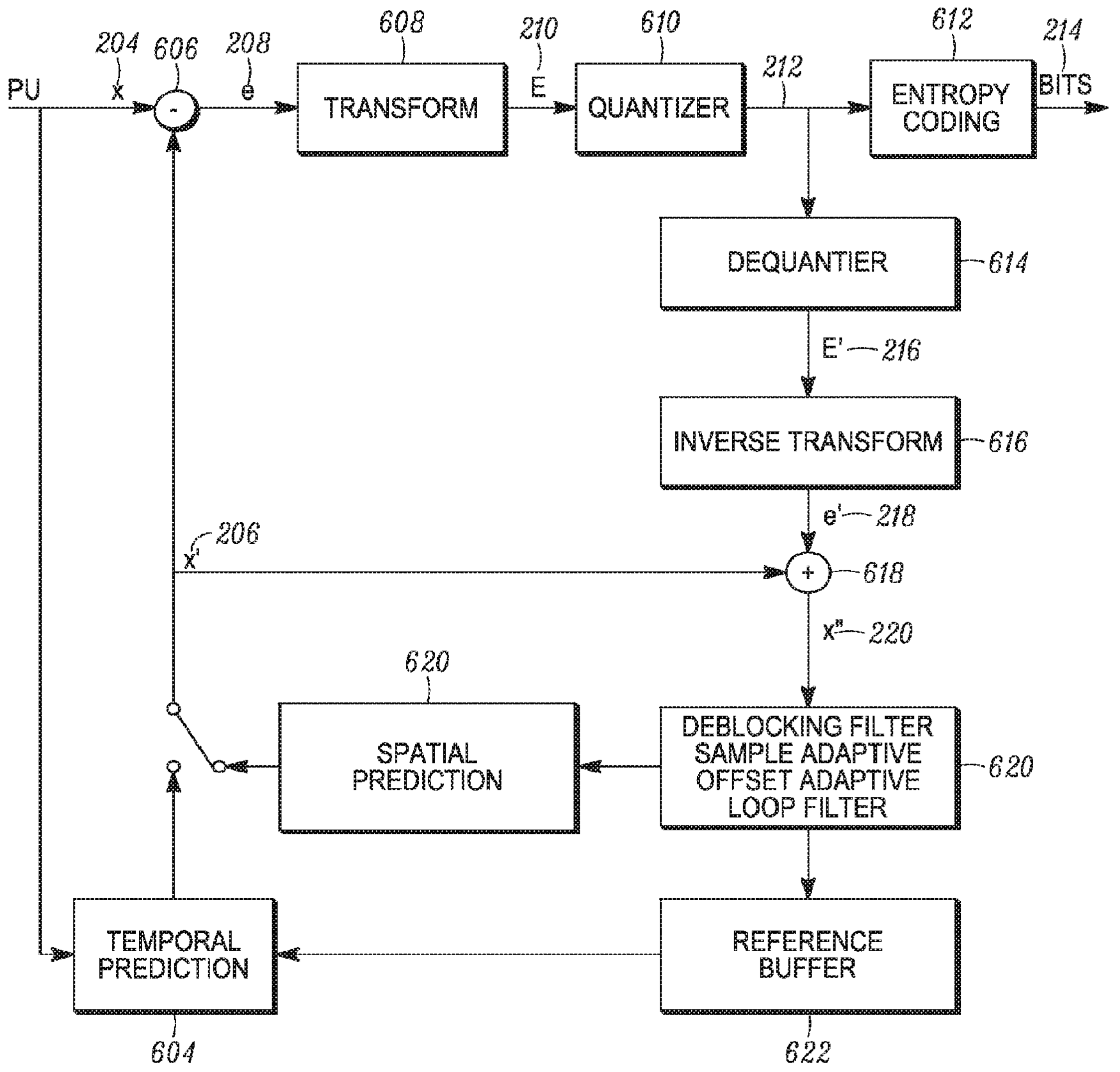
FIG. 6 depicts a block diagram of an embodiment of a method for encoding and/or decoding a Prediction Unit.

FIG. 6 depicts a block diagram of how a PU 204, x, can be encoded and/or decoded. At 606 a predicted PU 206, x', that is predicted by intra mode at 602 or inter mode at 604, as described above, can be subtracted from the current PU 204, x, to obtain a residual PU 208, e. At 608 the residual PU 208, e, can be transformed with a block transform into one or more transform units (TUs) 210, E. Each TU 210 can comprise one or more transform coefficients 212. In some embodiments, the block transform can be square. In alternate embodiments, the block transform can be non-square.

Figure 7:
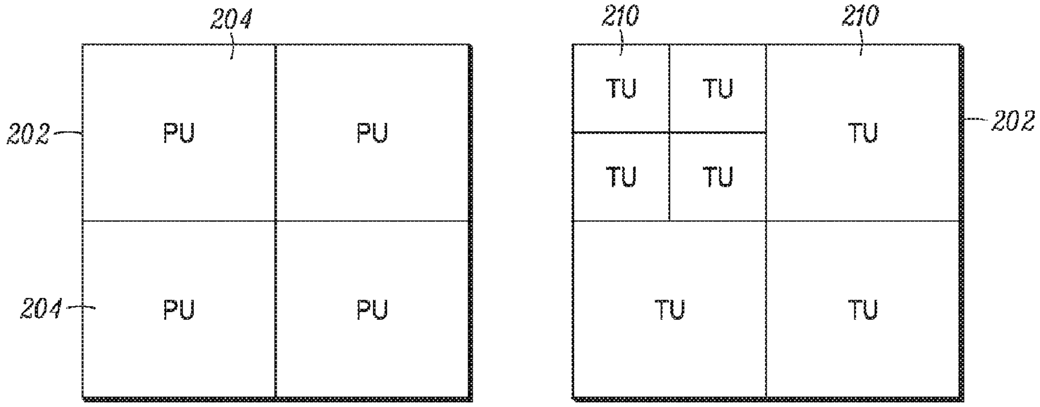
FIG. 7 depicts an exemplary embodiment of a Coding Unit divided into Prediction Units and Transform Units.
Figure 8:
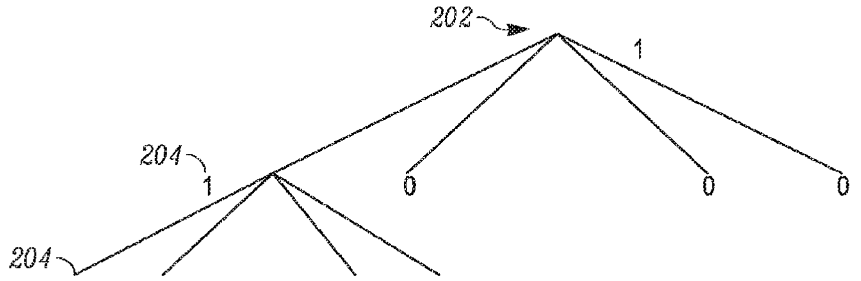
FIG. 8 depicts an exemplary embodiment of a quadtree representation of a Coding Unit divided into Transform Units.

As shown in FIG. 7, in HEVC, a set of block transforms of different sizes can be performed on a CU 202, such that some PUs 204 can be divided into smaller TUs 210 and other PUs 204 can have TUs 210 the same size as the PU 204. Division of CUs 202 and PUs 204 into TUs 210 can be shown by a quadtree representation. By way of a non-limiting example, the quadtree representation shown in FIG. 8 depicts the arrangement of TUs 210 within the CU 202 shown in FIG. 7.

Referring back to FIG. 6, at 610 the transform coefficients 212 of the TU 210, E, can be quantized into one of a finite number of possible values. In some embodiments, this is a lossy operation in which data lost by quantization may not be recoverable. After the transform coefficients 212 have been quantized, at 612 the quantized transform coefficients 212 can be entropy coded, as discussed below, to obtain the final compression bits 214.

At 614 the quantized transform coefficients 212 can be dequantized into dequantized transform coefficients 216 E'. At 616 the dequantized transform coefficients 216 E' can then be inverse transformed to reconstruct the residual PU 218, e'. At 618 the reconstructed residual PU 218, e', can then be added to a corresponding prediction PU 206, x', obtained through either spatial prediction at 602 or temporal prediction at 604, to obtain a reconstructed PU 220, x". At 620 a deblocking filter can be used on reconstructed PUs 220, x", to reduce blocking artifacts. At 620 a sample adaptive offset process is also provided that can be conditionally performed to compensate the pixel value offset between reconstructed pixels and original pixels. Further, at 620, an adaptive loop filter can be conditionally used on the reconstructed PUs 220, x", to reduce or minimize coding distortion between input and output images.

If the reconstructed image is a reference image that will be used for future temporal prediction in inter mode coding, the reconstructed images can be stored in a reference buffer 622. Intra mode coded images can be a possible point where decoding can begin without needing additional reconstructed images.

Figure 9:
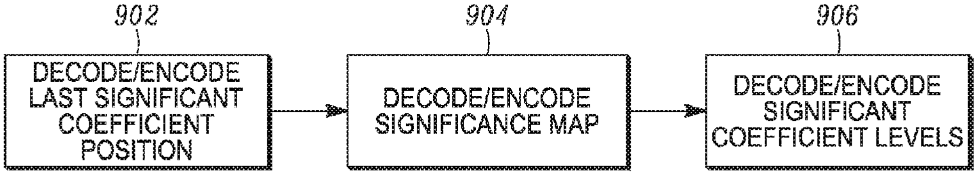
FIG. 9 depicts an embodiment of a method of performing context-based adaptive binary arithmetic coding.
Figure 10:
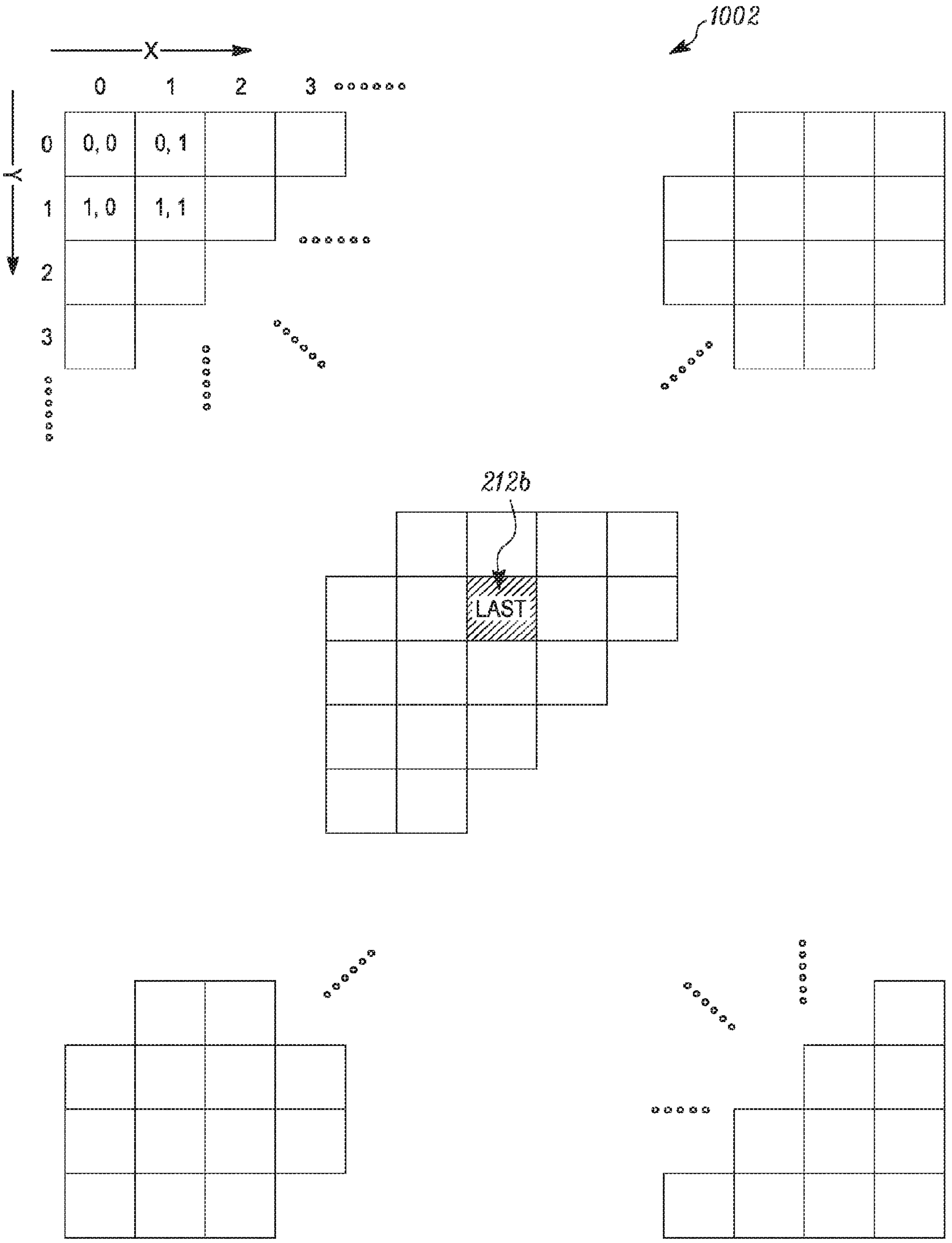
FIG. 10 depicts an exemplary embodiment of a significance map.

HEVC can use entropy coding schemes during step 612 such as context-based adaptive binary arithmetic coding (CABAC). The coding process for CABAC is shown in FIG. 9. At 902, the position of the last significant transform coefficient of the transform units 210 can be coded. Referring back to FIG. 6, the quantized transform coefficients are created by quantizing the TUs 210. Transform coefficients 212 can be significant or insignificant. FIG. 10 shows a significance map 1002 of the transform coefficients 212. Insignificant transform coefficients 212 can have a quantized value of zero, while significant transform coefficients 212 can have a quantized value of one or more. In some embodiments, significant transform coefficients 212 can also be known as non-zero quantized transform coefficients 212. If a TU 210 comprises one or more significant transform coefficients 212, the coordinates of the last significant transform coefficient 212 along a forward zig-zag coding scan from the top left corner of the TU 210 to the lower right corner of the TU 210, as shown in FIG. 10, can be coded. In alternate embodiments, the significant transform coefficients 212 can be scanned along an inverse wavefront scan, inverse horizontal scan, inverse vertical scan, or any other scan order. In some embodiments, these coordinates can be coded as the syntax elements "last_significant_coeff_y" and "last_significant_coeff_x." By way of a non-limiting example, FIG. 10 depicts the position of the last significant transform 212*b* within a TU 210 which is being coded in block 902 of FIG. 9.

At block 904 in FIG. 9, the significance map 1002 can be coded to indicate the positions of each of the significant transform coefficients 212 in the TU 210. A significance map 1002 can comprise a binary element for each position in the TU 210. The binary element can be coded as "0" to indicate that the transform coefficient 212 at that position is not significant. The binary element can be coded as "1" to indicate that the transform coefficient 212 at that position is significant.

Figure 11:
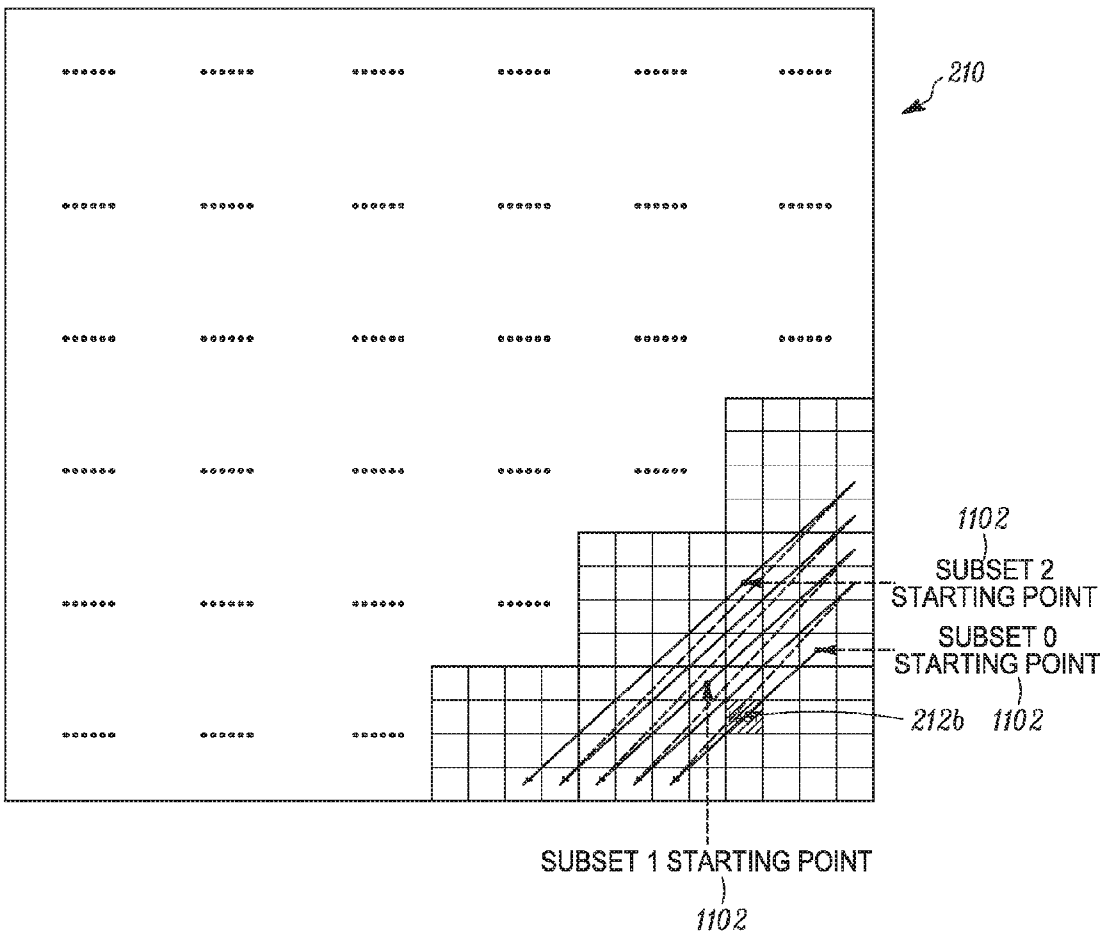
FIG. 11 depicts an embodiment of a reverse zig-zag scan of transform coefficients within a Transform Unit and subsets of transform coefficients.

FIG. 11 illustrates how the quantized transform coefficients 212 of the TUs 210 can be divided into groups. In some embodiments, the groups can be sub-blocks. Sub-blocks can be square blocks of 16 quantized transform coefficients 212. In other embodiments, the groups can be subsets 1102. Subsets 1102 can comprise 16 quantized transform coefficients 212 that are consecutive along the scan order of a backwards zig-zag scan, as shown in FIG. 11. The first subset can be the subset 1102 that includes the last significant transform coefficient 212*b*, regardless of where the last significant transform coefficient 212*b* is within the subset. By way of a non-limiting example, the last significant transform coefficient 212*b* can be the 14th transform coefficient 212 in the subset, followed by two insignificant transform coefficients.

In some situations and/or embodiments, there can be one or more groups of 16 quantized transform coefficients 212 that do not contain a significant transform coefficient along the reverse scan order prior to the group containing the last significant transform coefficient 212*b*. In these situations and/or embodiments, the first subset can be the subset 1102 containing the last significant transform coefficient 212*b*, and any groups before the first subset 1102 are not considered part of a subset 1102. By way of a non-limiting example, in FIG. 11, the first subset 1102 "Subset 0" is the second grouping of 16 transform coefficients 212 along the reverse zig-zap scan order, while the group of 16 transform coefficients 212 at the lower right corner of the TU 210 are not part of a subset 1102 because none of those transform coefficients 212 are significant. In some embodiments, the first subset 1102 can be denoted as "subset 0," and additional subsets 1102 can be denoted as "subset 1," "subset 2," up to "subset N." The last subset 1102 can be the subset 1102 with the DC transform coefficient 212 at position 0, 0 at the upper left corner of the TU 210.

Figure 12:
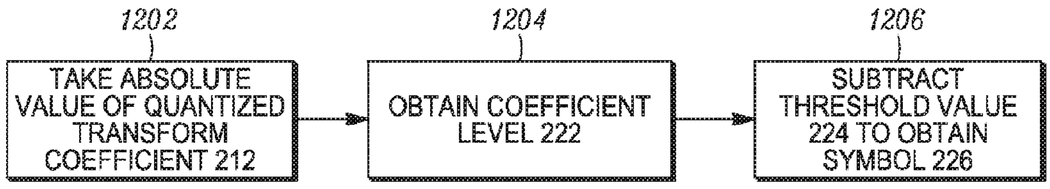
FIG. 12 depicts an embodiment of a method of obtaining coefficient levels and symbols for transform coefficients.

Referring back to FIG. 9 in the last block 906, each quantized transform coefficient 212 can be coded into binary values to obtain final compression bits 214 shown in FIG. 6, including coding for significant coefficient levels. During coding the absolute value of each quantized transform coefficient 212 can be coded separately from the sign of the quantized transform coefficient 212. FIG. 12 illustrates coding steps that deal with taking an absolute value of the quantized transform coefficients. As shown in FIG. 12, at 1202 the absolute value of each quantized transform coefficient 212 can be taken to enable obtaining the coefficient level 222 for that quantized transform coefficient 212 at block 1204.

The coefficient levels 222 obtained at block 1204 that are expected to occur with a higher frequency can be coded before coefficient levels 222 that are expected to occur with lower frequencies. By way of a non-limiting example, in some embodiments coefficient levels 222 of 0, 1, or 2 can be expected to occur most frequently. Coding the coefficient levels 222 in three parts can identify the most frequently occurring coefficient levels 222, leaving more complex calculations for the coefficient levels 222 that can be expected to occur less frequently. In some embodiments, this can be done by coding the coefficient levels 222 in three parts. First, the coefficient level 222 of a quantized transform coefficient 212 can be checked to determine whether it is greater than one. If the coefficient level 222 is greater than one, the coefficient level 222 can be checked to determine whether it is greater than two.

At 1206 in FIG. 12, if the coefficient level 222 is greater than two, the coefficient level 222 can be subtracted by a threshold value 224 of three to obtain a symbol. By way of a non-limiting example, in some embodiments, the coefficient level 222 can be coded as three variables: "coeff_abs_level_greater1_flag," "coeff_abs_level_greater2_flag," and "coeff_abs_level_minus3." For quantized transform coefficients 212 with a coefficient level 222 of two or more, “coeff_abs_level_greater1_flag” can be set to “1.” If “coeff_abs_level_greater1_flag” is set to “1” and the quantized transform coefficient 212 also has a coefficient level 222 of three or more, “coeff_abs_level_greater2_flag” can be set to “1.” If “coeff_abs_level_greater2_flag” is set to “1,” the threshold value 224 of three can be subtracted from the coefficient level 222 to get the quantized transform coefficient's symbol 226, coded as “coeff_abs_level_minus3.” In alternate embodiments, the coefficient level 222 can be coded in a different number of parts, and/or the threshold value 224 can be an integer other than three.

Figure 13:
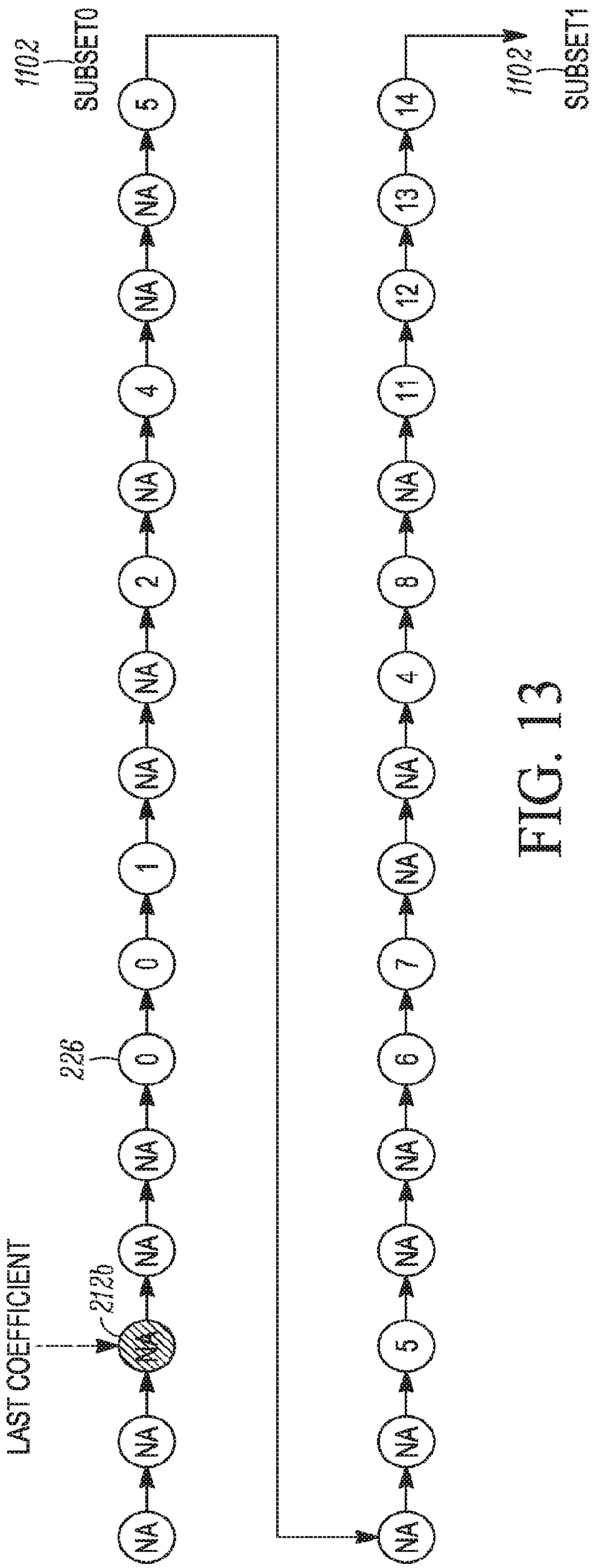
FIG. 13 depicts an embodiment of the scanning order of transform coefficients within subsets.

FIG. 14 depicts an exemplary table of binary codewords 228 generated based on symbols 226 and parameter variables 230. For the quantized transform coefficients 212 that occur less frequently and have coefficient levels 222 of three or more, as determined in the blocks of FIG. 12, the quantized transform coefficient's symbol 226 can be converted to a binary codeword 228 that can be part of the final compression bits 214 generated as shown in FIG. 6. The binary codeword 228 shown in FIG. 14 can be a bin string comprising one or more bins. Each bin can be a one bit binary element. Each symbol 226 can be coded by scanning through each subset 1102 or sub-block and converting each symbol 226 of the subset 1102 or sub-block in order according to the value of a parameter variable 230, and then moving to the symbols 226 of the next subset 1102 or sub-block. A diagram showing this coding progression is shown in FIG. 13 for the subsets 0 and 1 along the zig-zag lines of FIG. 11. In some embodiments, the current scanning position can be denoted by “n.”

Referring back to FIG. 14, the parameter variable 230 can be a global variable that can be updated as each symbol 226 is coded. The parameter variable 230 can control the flatness of the codeword distribution. In some embodiments, the parameter variable 230 can be any integer between 0 and N. By way of a non-limiting example, in some embodiments N can be 3, such that the parameter variable 230 can be 0, 1, 2, or 3. In some embodiments, the parameter variable 230 can be denoted as “cRiceParam” as illustrated in FIG. 14.

Figures 15, 16:
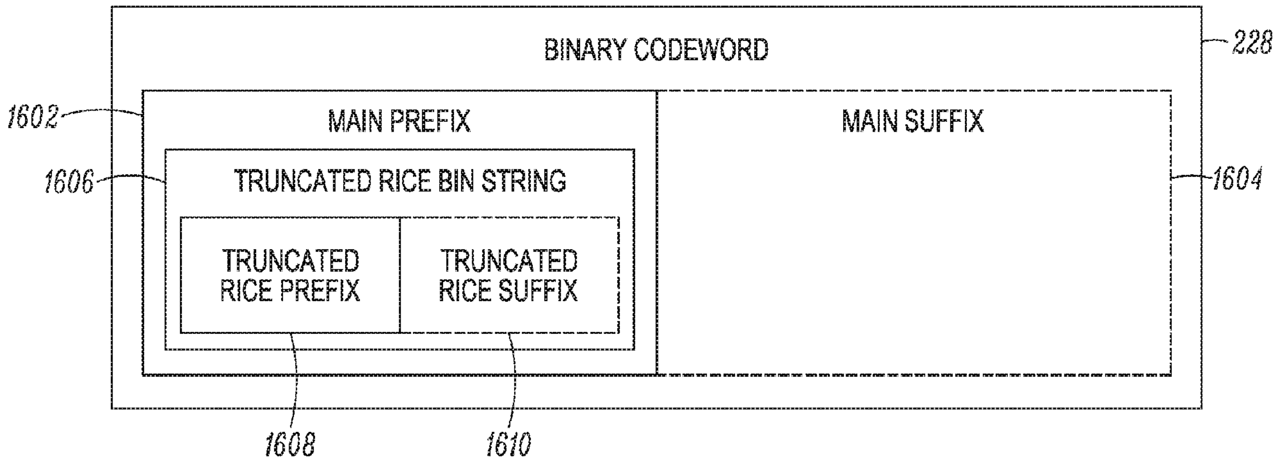
FIG. 15 depicts an exemplary embodiment of an update table for updating the parameter variable.
FIG. 16 depicts an embodiment of a binary codeword.

FIG. 15 provides a table illustrating how in some embodiments the parameter values 230 can be updated over time for each symbol 226. To determine updates, in some embodiments, the parameter variable can be reset to zero at the beginning of each subset 1102 or sub-block, and can then be updated after each symbol 226 is converted to a binary codeword 228. The parameter variables 230 can be updated based on the last value of the parameter variable 230 and the value of the last converted symbol 226. In alternate embodiments, the parameter variable 230 can be initially set to zero, and then be updated after each symbol 226 is converted to a binary codeword 228 based on the last value of the parameter variable 230 and the value of the last converted symbol 226, including symbols 226 in previous subsets. In some embodiments, the parameter variable 230 can be updated based on a table of prediction values, such as the table 1504 shown in FIG. 15.

In some situations and/or embodiments, converting the symbol 226 with a lower parameter variable 230 can result in a binary codeword 228 having fewer bits than converting the same symbol 226 with a higher parameter variable 230. By way of a non-limiting example, as shown by the table depicted in FIG. 14, using a parameter variable 230 of 0 to convert a symbol 226 of 0 can result in the binary codeword 228 of “0” having 1 bit, while using the parameter variable 230 of 1 to convert the symbol 226 of 0 can result in the binary codeword 228 of “00” having 2 bits.

In other situations and/or embodiments, converting the symbol 226 with a higher parameter variable 230 can result in a binary codeword 228 having fewer bits than converting the same symbol 226 with a lower parameter variable 230. By way of a non-limiting example, as shown in the table depicted in FIG. 14, using a parameter variable 230 of 0 to convert a symbol 226 of 6 can result in the binary codeword 228 of “1111110” having 7 bits, while using the parameter variable 230 of 2 to convert the symbol 226 of 6 can result in the binary codeword 228 of “1010” having 4 bits.

FIG. 16 depicts an embodiment of the elements contained in a binary codeword 228. The binary codeword 228 can have a main prefix 1602 comprising one or more bins. In some situations and/or embodiments, the binary codeword 228 can also have a main suffix 1604 comprising one or more bins. The main suffix 1604 can be concatenated with the end of the main prefix 1602 to obtain the binary codeword 228 for the symbol 226. In other situations and/or embodiments, the main suffix 1604 can be absent, and the binary codeword 228 can be the main prefix 1602.

The main prefix 1602 for the symbol 226 can be determined by a Truncated Rice binarization process that takes the symbol 226, the parameter variable 230, and a maximum symbol value 232, illustrated in FIGS. 17A and 17B, as inputs, and outputs a Truncated Rice bin string 1606 as the main prefix 1602. In some conventional systems, such as the reference software HM4.0, the maximum length of the main prefix 1602 is controlled by the constant UInt g_auiGoRicePrefixLen[4]={8, 10, 11, 8}. However, the codewords 228 generated by these values can introduce redundancies that can be decreased in part by using the constant UInt g_auiGoRicePrefixLen[4]={8, 10, 10, 8}. By way of a non-limiting example, FIG. 18 depicts a portion of the table depicted in FIG. 14 for symbols 226 ranging from 40 to 43 using the parameter variable 230 cRiceParam set to 2. The left side of the table uses HM4.0 with UInt g_auiGoRicePrefixLen[4]={8, 10, 11, 8} and generates codewords 228 having more bits than the codewords 228 on the right side of the table generated using UInt g_auiGoRicePrefixLen[4]={8, 10, 10, 8}. The table shown in FIG. 14 uses codewords 228 generated with UInt g_auiGoRicePrefixLen[4]={8, 10, 10, 8}.

Each possible value of the parameter variable 230 can have an associated maximum symbol value 232. In some embodiments, the maximum symbol value 232 for a particular parameter variable 230 can be denoted as “cTRMax.” By way of a non-limiting example, FIGS. 17A and 17B depicts exemplary tables of maximum symbol values 232 “cTRMax” for parameter variables 230 “cRiceParam.”

The Truncated Rice bin string 1606 can have a Truncated Rice prefix 1608 comprising one or more bins. In some situations and/or embodiments, the Truncated Rice bin string 1606 can also have a Truncated Rice suffix 1610 comprising one or more bins. The Truncated Rice suffix 1610 can be concatenated with the end of the Truncated Rice prefix 1608 to obtain the Truncated Rice bin string 1606 for the symbol 226, which can be used as the main prefix 1602. In other situations and/or embodiments, the Truncated Rice suffix 1610 can be absent, and the Truncated Rice bin string 1606 can be the Truncated Rice prefix 1608.

Figure 19:
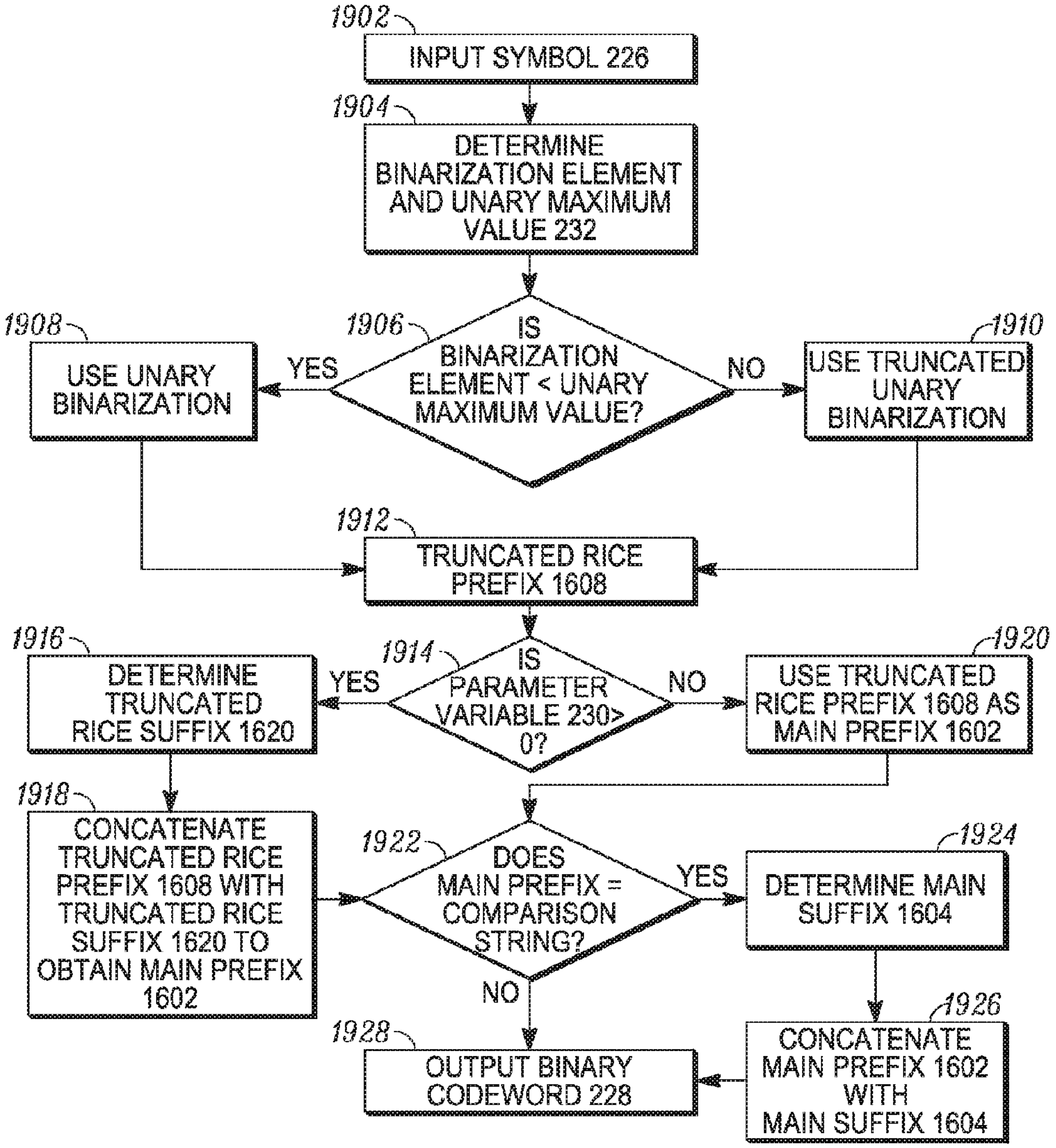
FIG. 19 depicts an embodiment of a flow chart of a method for determining a binary codeword for a symbol.

FIG. 19 depicts a flow chart of a method for determining the binary codeword 228 for each symbol 226. At 1902, the symbol 226 can be accepted as an input. At 1904, a binarization element and a unary maximum value can be determined based on the value of the symbol 226. To determine the binarization element, the value of the symbol 226 and the maximum symbol value 232 can be compared to determine which is smaller, and the smaller of the two values can be right arithmetic shifted by a number of binary digits equal to the value of the parameter variable 230. If the value of the symbol 226 and the maximum symbol value 232 are equal, the value they share can be right arithmetic shifted by a number of binary digits equal to the value of the parameter variable 230 to obtain the binarization element. In some embodiments, the value of the symbol 226 can be expressed as "synElVal," and the right arithmetic shift to determine the binarization element can be expressed as "min(synElVal, cTRMax)>>cRiceParam." Performing a right arithmetic shift of a first value by a number of binary digits equal to the value of a second value can be the equivalent of dividing the first value by 2^second value, and rounding the result toward negative infinity to obtain an integer.

The unary maximum value can be the maximum possible value of the binarization element. The unary maximum value can be determined by performing a right arithmetic shift of the maximum symbol value 232 by a number of binary digits equal to the value of the parameter variable 230. In some embodiments, the right arithmetic shift to determine the unary maximum value can be expressed as "cTRMax>>cRiceParam." In some embodiments, the unary maximum value can be denoted as "cMax."

At 1906 in FIG. 19, the binarization element can be compared to the unary maximum value. If the binarization element is less than the unary maximum value, the binarization element can be converted to a Truncated Rice prefix 1608 (FIG. 16) and provided to box 1912 using a Unary Binarization Process at 1908. If the binarization element is equal to the unary maximum value, the binarization element can be converted to Truncated Rice prefix 1608 and provided to box 1912 using a Truncated Unary Binarization Process at 1910.

In the Unary Binarization Process at 1908, the Truncated Rice prefix 1608 can be a bin string comprising a number of bins equal to the value of the binarization element plus one. Bins in the bin string can be at positions 0 to N. For positions less than the value of the binarization element, the bins can be set to "1." For the last position, the position equal to the value of the binarization element, the bin can be set to "0."

FIG. 20 depicts a table 2000 of bin strings for binarization elements with values ranging from zero to five, indexed by the bin position (binIdx). By way of non-limiting examples as shown in FIG. 20, the Truncated Rice prefix 1608 for a binarization element of 4 can be a bin string of 11110, and the Truncated Rice prefix 1608 for a binarization element of 2 can be a bin string of 110.

Referring back to FIG. 19, in the Truncated Binarization Process at 1910, the Truncated Rice prefix 1608 can be a bin string having a number of bins equal to the unary maximum value, with all bins set to "1." By way of a non-limiting example, for a unary maximum value of 8, the Truncated Rice prefix 1608 for a binarization element of 8 can have a length of eight bins with all eight bins set to "1," such as 11111111. It should be noted that in some conventional systems the maximum symbol values 232 shown in FIG. 17A are used, with the maximum symbol value of "7" for the parameter variable "0". However, this can introduce errors in some existing systems, as no process is specified in these existing systems when the symbol is greater than the unary maximum value. For example, in some conventional systems, when the maximum symbol value is 7, the symbol is 8, and the parameter variable is 0, the codeword generation can fail. In contrast, by using the maximum symbol values 232 shown in FIG. 17B, with the maximum symbol value of "8" for the parameter variable "0", when the symbol is 8 the process can move to step 1910 and determine the Truncated Rice prefix of 11111111 as described above.

At 1912, the value of the Truncated Rice prefix 1608 can be output by the Unary Binarization Process at 1908 or the Truncated Unary Binarization Process at 1910.

At 1914, the parameter variable 230 can be checked to determine if the parameter variable 230 is greater than zero. If the value of the parameter variable 230 is zero, the Truncated Rice prefix 1608 (FIG. 16) can be used as the entire main prefix 1602 at 1920. If the value of the parameter variable 230 is greater than zero, the Truncated Rice suffix 1610 (FIG. 16) can be determined at 1916. The Truncated Rice suffix 1610 can be a bin string having a length equal to the value of the parameter variable 230. The symbol 226 can be right arithmetic shifted by a number of binary digits equal to the parameter variable 230. The result can be left arithmetic shifted by a number of binary digits equal to the parameter variable 230. Performing a left arithmetic shift of a first value by a number of binary digits equal to the value of a second value can be the equivalent of multiplying the first value by 2^second value. The result of the left arithmetic shift can be subtracted from the value of the symbol 226, and the binary representation of this result having the same number of bins as the value of the parameter variable 230 can be the Truncated Rice suffix 1610. In some embodiments in which the value of the symbol 226 is expressed as "synElVal," the operation at 1916 can be expressed as "synElVal−((synElVal>>cRiceParam)<<cRiceParam)." At 1918, the Truncated Rice suffix 1610 can be concatenated to the end of the Truncated Rice prefix 1608 to determine the full Truncated Rice bin string 1606, which can be used as the main prefix 1602.

At 1922, the main prefix 1602 can be compared to a comparison string. A comparison string can be a string of one or more bins all set to "1," with the number of bins in the comparison string being determined by right arithmetic shifting the maximum symbol value 232 by a number of binary digits equal to the parameter variable 230, and then adding the value of the parameter variable 230. In some embodiments, the determination of the length of the comparison string can be expressed as "(cTRMax>>cRiceParam)+cRiceParam." If the main prefix 1602 is the same as the comparison string, the main suffix 1604 can be determined at 1924 and concatenated to the end of the main prefix 1602 at 1926 to determine the final binary codeword 228 bin string for the symbol 226 at 1928. The main suffix 1604 can be the 0th order Exponential-Golomb (Exp-Golomb) code for the value of the symbol 226 minus the maximum symbol value 232 minus one. In some embodiments in which the value of the symbol 226 is expressed as "coeff_abs_level_minus3[n]," the operation at 1824 can be expressed as the 0th order Exp-Golomb code for "coeff_abs_level_minus3[n]−cTRMax−1." If the main prefix 1602 is different from the comparison string, the main suffix 1604 can be absent and the main prefix 1602 can be used as the final binary codeword 228 bin string for the symbol 226. The final binary codeword can then be output at 1928.

Figure 21:
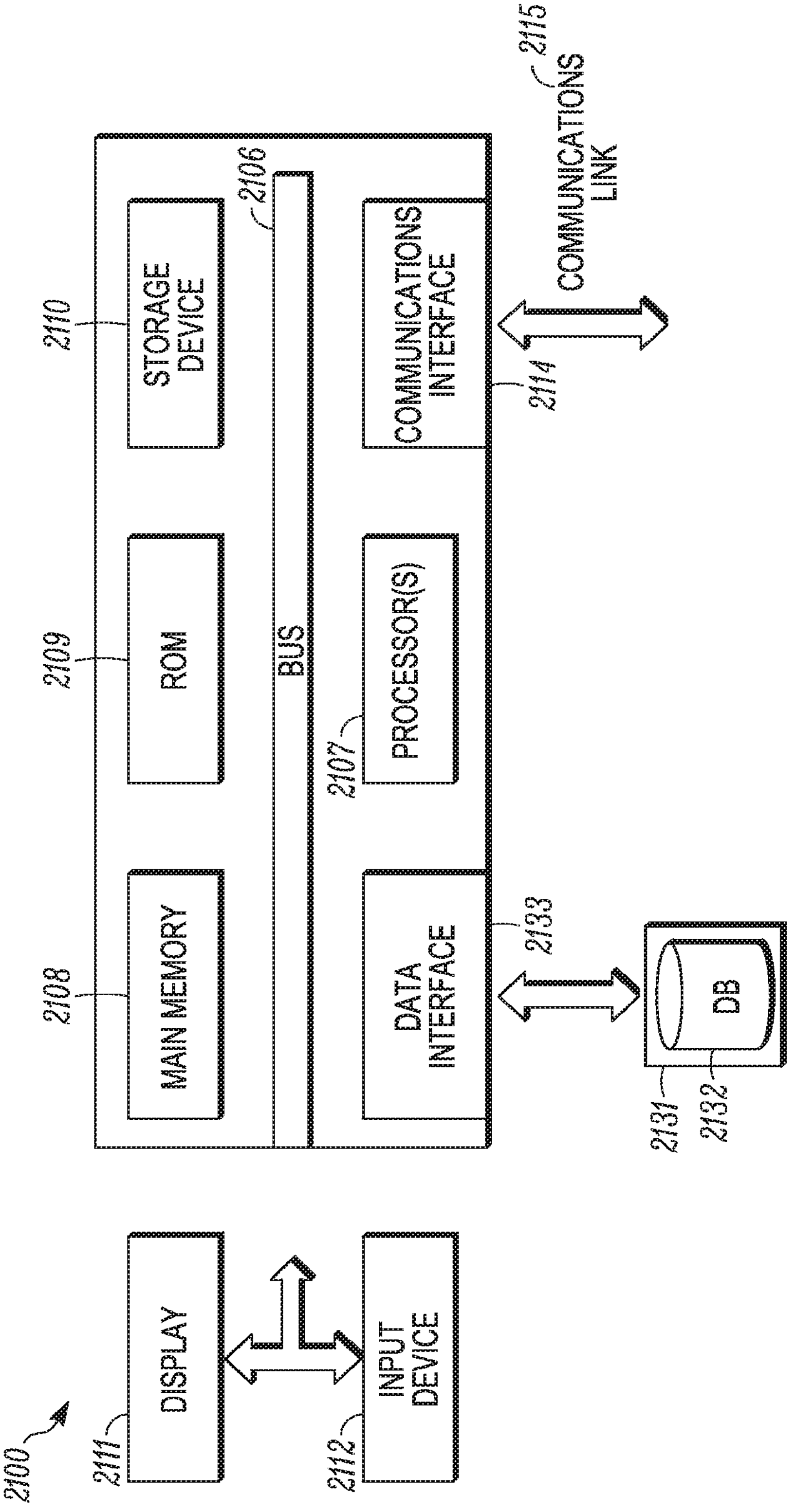
FIG. 21 depicts an exemplary embodiment of computer hardware.

The execution of the sequences of instructions required to practice the embodiments may be performed by a computer system 2100 as shown in FIG. 21. In an embodiment, execution of the sequences of instructions is performed by a single computer system 2100. According to other embodiments, two or more computer systems 2100 coupled by a communication link 2115 may perform the sequence of instructions in coordination with one another. Although a description of only one computer system 2100 may be presented herein, it should be understood that any number of computer systems 2100 may be employed.

A computer system 2100 according to an embodiment will now be described with reference to FIG. 20, which is a block diagram of the functional components of a computer system 2100. As used herein, the term computer system 2100 is broadly used to describe any computing device that can store and independently run one or more programs.

The computer system 2100 may include a communication interface 2114 coupled to the bus 2106. The communication interface 2114 provides two-way communication between computer systems 2100. The communication interface 2114 of a respective computer system 2100 transmits and receives electrical, electromagnetic or optical signals that include data streams representing various types of signal information, e.g., instructions, messages and data. A communication link 2115 links one computer system 2100 with another computer system 2100. For example, the communication link 2115 may be a LAN, an integrated services digital network (ISDN) card, a modem, or the Internet.

A computer system 2100 may transmit and receive messages, data, and instructions, including programs, i.e., application, code, through its respective communication link 2115 and communication interface 2114. Received program code may be executed by the respective processor(s) 2107 as it is received, and/or stored in the storage device 2110, or other associated non-volatile media, for later execution.

In an embodiment, the computer system 2100 operates in conjunction with a data storage system 2131, e.g., a data storage system 2131 that contains a database 2132 that is readily accessible by the computer system 2100. The computer system 2100 communicates with the data storage system 2131 through a data interface 2133.

Computer system 2100 can include a bus 2106 or other communication mechanism for communicating the instructions, messages and data, collectively, information, and one or more processors 2107 coupled with the bus 2106 for processing information. Computer system 2100 also includes a main memory 2108, such as a random access memory (RAM) or other dynamic storage device, coupled to the bus 2106 for storing dynamic data and instructions to be executed by the processor(s) 2107. The computer system 2100 may further include a read only memory (ROM) 2109 or other static storage device coupled to the bus 2106 for storing static data and instructions for the processor(s) 2107. A storage device 2110, such as a magnetic disk or optical disk, may also be provided and coupled to the bus 2106 for storing data and instructions for the processor(s) 2107.

A computer system 2100 may be coupled via the bus 2106 to a display device 2111, such as an LCD screen. An input device 2112, e.g., alphanumeric and other keys, is coupled to the bus 2106 for communicating information and command selections to the processor(s) 2107.

According to one embodiment, an individual computer system 2100 performs specific operations by their respective processor(s) 2107 executing one or more sequences of one or more instructions contained in the main memory 2108. Such instructions may be read into the main memory 2108 from another computer-usable medium, such as the ROM 2109 or the storage device 2110. Execution of the sequences of instructions contained in the main memory 2108 causes the processor(s) 2107 to perform the processes described herein. In alternative embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed is:

1. A method of decoding a symbol from an encoded video stream, comprising:

decoding a binary codeword from an encoded video stream; and decoding a symbol from the binary codeword, wherein the binary codeword is a binary codeword generated by an encoder for the symbol by:

determining a truncated rice prefix for a symbol, the symbol having a parameter variable;

in response to a determination that the parameter variable is greater than zero, determining a truncated rice suffix for the symbol and concatenating the end of the truncated rice prefix with the truncated rice suffix to determine a main prefix; and in response to a determination that the main prefix is the same as a comparison string, wherein the comparison string is a bin string with each bin set to "1", determining a main suffix for the symbol by concatenating the end of the main prefix with the main suffix to determine the binary codeword for the symbol.

2. The method of claim 1, wherein decoding the symbol includes decoding the symbol on a condition that the binary codeword is a binary codeword generated by the encoder for the symbol by, in response to a determination that the parameter variable is equal to zero, determining a main prefix for the symbol by setting the main prefix to the truncated rice prefix.

3. The method of claim 1, wherein decoding the symbol includes decoding the symbol on a condition that the binary codeword is a binary codeword generated by the encoder for the symbol by, in response to a determination that the main prefix differs from the comparison string, determining the binary codeword for the symbol by setting the binary codeword to the main prefix.

4. The method of claim 1, wherein decoding the symbol includes decoding the symbol on a condition that the binary codeword is a binary codeword generated by the encoder for the symbol by determining the truncated rice prefix such that determining the truncated rice prefix includes:

determining a binarization element by right arithmetic shifting the smaller of the value of the symbol and a maximum symbol value by a number of binary digits equal to the value of the parameter variable;

determining a unary maximum value by right arithmetic shifting the maximum symbol value by a number of binary digits equal to the value of the parameter variable;

in response to a determination that the binarization element is less than the unary maximum value, determining the truncated rice prefix by a unary binarization process; and in response to a determination that the binarization element is equal to the unary maximum value, determining the truncated rice prefix by a truncated unary binarization process.

5. The method of claim 1, wherein decoding the symbol includes decoding the symbol on a condition that the binary codeword is a binary codeword generated by the encoder for the symbol by determining the truncated rice suffix such that the truncated rice suffix is determined by:

right arithmetic shifting the symbol by a number of binary digits equal to the value of the parameter variable to obtain a first result;

left arithmetic shifting the first result by a number of binary digits equal to the value of the parameter variable to obtain a second result;

subtracting the second result from the symbol to obtain a third result; and binarizing the third result to obtain the truncated rice suffix.

6. The method of claim 1, wherein decoding the symbol includes decoding the symbol on a condition that the binary codeword is a binary codeword generated by the encoder for the symbol such that the binary codeword is a representation of a transform coefficient provided within a transform unit, the transform unit being a subdivision of a coding unit in a High Efficiency Video Coding signal.

7. The method of claim 1, wherein decoding the symbol includes decoding the symbol on a condition that the binary codeword is a binary codeword generated by the encoder for the symbol such that the main suffix is determined by a 0th order exponential Golomb code for the value of the symbol minus a maximum symbol value minus one.

8. The method of claim 1, wherein decoding the symbol includes decoding the symbol on a condition that the binary codeword is a binary codeword generated by the encoder for the symbol such that the maximum symbol value is eight on a condition that the parameter variable is zero, the maximum symbol value is twenty on a condition that the parameter variable is one, the maximum symbol value is forty-two on a condition that the parameter variable is two, and the maximum symbol value is seventy on a condition that the parameter variable is three.

9. A video decoder comprising:

a memory configured to store a symbol; and a processor coupled with the memory, wherein the processor is configured to determine the symbol from a binary codeword by:

decoding the binary codeword from an encoded video stream; and decoding the symbol from the binary codeword, wherein the binary codeword is a binary codeword generated by an encoder for the symbol by:

determining a truncated rice prefix for the symbol;

in response to a determination that a parameter variable is greater than zero, determining a truncated rice suffix for the symbol and determining a main prefix by concatenating the end of the truncated rice prefix with the truncated rice suffix; and in response to a determination that the main prefix is the same as a comparison string, wherein the comparison string is a bin string with each bin set to "1" determining a main suffix for the symbol and determining the binary codeword by concatenating the end of the main prefix with the main suffix.

10. The video decoder of claim 9, wherein the processor is configured to decode the symbol on a condition that the binary codeword is a binary codeword generated by the encoder for the symbol by determining the truncated rice prefix such that determining the truncated rice prefix includes:

determining a binarization element by right arithmetic shifting the smaller of the value of the symbol and the maximum symbol value by a number of binary digits equal to the value of the parameter variable;

determining a unary maximum value by right arithmetic shifting the maximum symbol value by a number of binary digits equal to the value of the parameter variable;

determining the truncated rice prefix by a unary binarization process when the binarization element is less than the unary maximum value; and determining the truncated rice prefix by a truncated unary binarization process when the binarization element is equal to the unary maximum value.

11. The video decoder of claim 9, wherein the processor is configured to decode the symbol on a condition that the binary codeword is a binary codeword generated by the encoder for the symbol by determining the truncated rice suffix such that determining the truncated rice suffix includes:

right arithmetic shifting the symbol by a number of binary digits equal to the value of the parameter variable to obtain a first result;

left arithmetic shifting the first result by a number of binary digits equal to the value of the parameter variable to obtain a second result;

subtracting the second result from the symbol to obtain a third result; and binarizing the third result to obtain the truncated rice suffix.

12. The video decoder of claim 11, wherein the processor is configured to decode the symbol on a condition that the binary codeword is a binary codeword generated by the encoder for the symbol by determining the truncated rice suffix such that the length of the truncated rice suffix is equal to the value of the parameter variable.

13. The video decoder of claim 9, wherein the processor is configured to decode the symbol on a condition that the binary codeword is a binary codeword generated by the encoder for the symbol such that the comparison string has a length determined by the encoder by right arithmetic shifting the maximum symbol value by a number of binary digits equal to the parameter variable, and adding the value of the parameter variable.

14. The video decoder of claim 9, wherein the processor is configured to decode the symbol on a condition that the binary codeword is a binary codeword generated by the encoder for the symbol such that the main suffix is determined by a 0th order exponential Golomb code for the value of the symbol minus a maximum symbol value minus one.

15. The video decoder of claim 9, wherein the processor is configured to decode the symbol on a condition that the binary codeword is a binary codeword generated by the encoder for the symbol such that the maximum symbol value is eight on a condition that the parameter variable is zero, the maximum symbol value is twenty on a condition that the parameter variable is one, the maximum symbol value is forty-two on a condition that the parameter variable is two, and the maximum symbol value is seventy on a condition that the parameter variable is three.

16. A non-transitory computer readable medium containing program instructions for determining a symbol from a binary codeword, that, when executed by a processor, facilitate performance of operations, comprising:

decoding a binary codeword from an encoded video stream; and decoding a symbol from the binary codeword, wherein the binary codeword is a binary codeword generated by an encoder for the symbol by:

receiving a symbol, a parameter variable, and a maximum symbol value associated with the parameter variable;

determining a truncated rice prefix for the symbol, in response to a determination that the parameter variable is greater than zero, determining a truncated rice suffix for the symbol and determining a main prefix by concatenating the end of the truncated rice prefix with the truncated rice suffix; and in response to a determination that the main prefix is the same as a comparison string, wherein the comparison string is a bin string with each bin set to "1", determining a main suffix for the symbol and determining the binary codeword for the symbol by concatenating the end of the main prefix with the main suffix.

17. The non-transitory computer readable medium of claim 16, wherein execution of the program instructions by the processor facilitates performance of operations, comprising decoding the symbol from the binary codeword, wherein the binary codeword is a binary codeword generated by an encoder for the symbol by:

determining a binarization element by right arithmetic shifting the smaller of the value of the symbol and the maximum symbol value by a number of binary digits equal to the value of the parameter variable;

determining a unary maximum value by right arithmetic shifting the maximum symbol value by a number of binary digits equal to the value of the parameter variable;

in response to a determination that the binarization element is less than the unary maximum value, determining the truncated rice prefix by a unary binarization process; and in response to a determination that the binarization element is equal to the unary maximum value, determining the truncated rice prefix by a truncated unary binarization process.

18. The non-transitory computer readable medium of claim 16, wherein execution of the program instructions by the processor facilitates performance of operations, comprising decoding the symbol from the binary codeword, wherein the binary codeword is a binary codeword generated by an encoder for the symbol by:

right arithmetic shifting the symbol by a number of binary digits equal to the value of the parameter variable to obtain a first result;

left arithmetic shifting the first result by a number of binary digits equal to the value of the parameter variable to obtain a second result; subtracting the second result from the symbol to obtain a third result; and binarizing the third result to obtain the truncated rice suffix.

19. The non-transitory computer readable medium of claim 16, wherein execution of the program instructions by the processor facilitates performance of operations, comprising decoding the symbol from the binary codeword, wherein the binary codeword is a binary codeword generated by an encoder for the symbol such that the main suffix is determined by a 0th order exponential Golomb code for the value of the symbol minus a maximum symbol value minus one.

20. The non-transitory computer readable medium of claim 16, wherein execution of the program instructions by the processor facilitates performance of operations, comprising decoding the symbol from the binary codeword, wherein the binary codeword is a binary codeword generated by an encoder for the symbol such that the maximum symbol value is eight on a condition that the parameter variable is zero, the maximum symbol value is twenty on a condition that the parameter variable is one, the maximum symbol value is forty-two on a condition that the parameter variable is two, and the maximum symbol value is seventy on a condition that the parameter variable is three.

* * * * *